United States Patent
Graham

[11] 3,762,169
[45] Oct. 2, 1973

[54] FLOATING WATER JET FOR OIL SLICK CONTROL

[75] Inventor: Douglas J. Graham, Port Hueneme, Calif.

[73] Assignee: The United States of America as represented by the Secretary of the Navy, Washington, D.C.

[22] Filed: Aug. 23, 1972

[21] Appl. No.: 283,021

[52] U.S. Cl. ............ 61/1 F, 210/242, 210/DIG. 21, 239/550, 239/587, 239/598
[51] Int. Cl. ......................... E02b 15/04, B05b 1/04
[58] Field of Search .................. 239/548, 550, 568, 239/587, 597, 598; 210/242, DIG. 21; 61/1 F

[56] References Cited
UNITED STATES PATENTS

| | | |
|---|---|---|
| 3,348,690 | 10/1967 | Cornelissen ........................ 210/242 |
| 3,578,171 | 5/1971 | Usher ........................... 210/DIG. 21 |
| 3,659,713 | 5/1972 | Mueller .................... 210/DIG. 21 X |
| 3,661,264 | 5/1972 | Peterson et al. ......... 210/DIG. 21 X |

Primary Examiner—M. Henson Wood, Jr.
Assistant Examiner—Michael Mar
Attorney—Richard S. Sciascia et al.

[57] ABSTRACT

A device to direct floating oil into a recovery mechanism comprising a flexible rubber hose having attached floats positioned at spaced intervals. Water jets are operatively connected to the hose between the floats, and counterweights are added to uniformly balance the unit. A water pump provides water to the hose which is sprayed by the jets against the oil slick, forcing it to the recovery mechanism.

6 Claims, 3 Drawing Figures

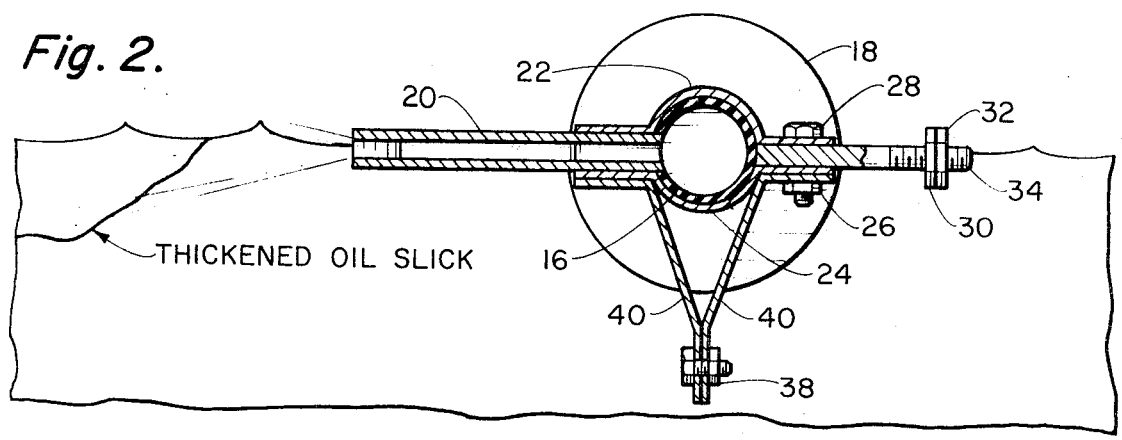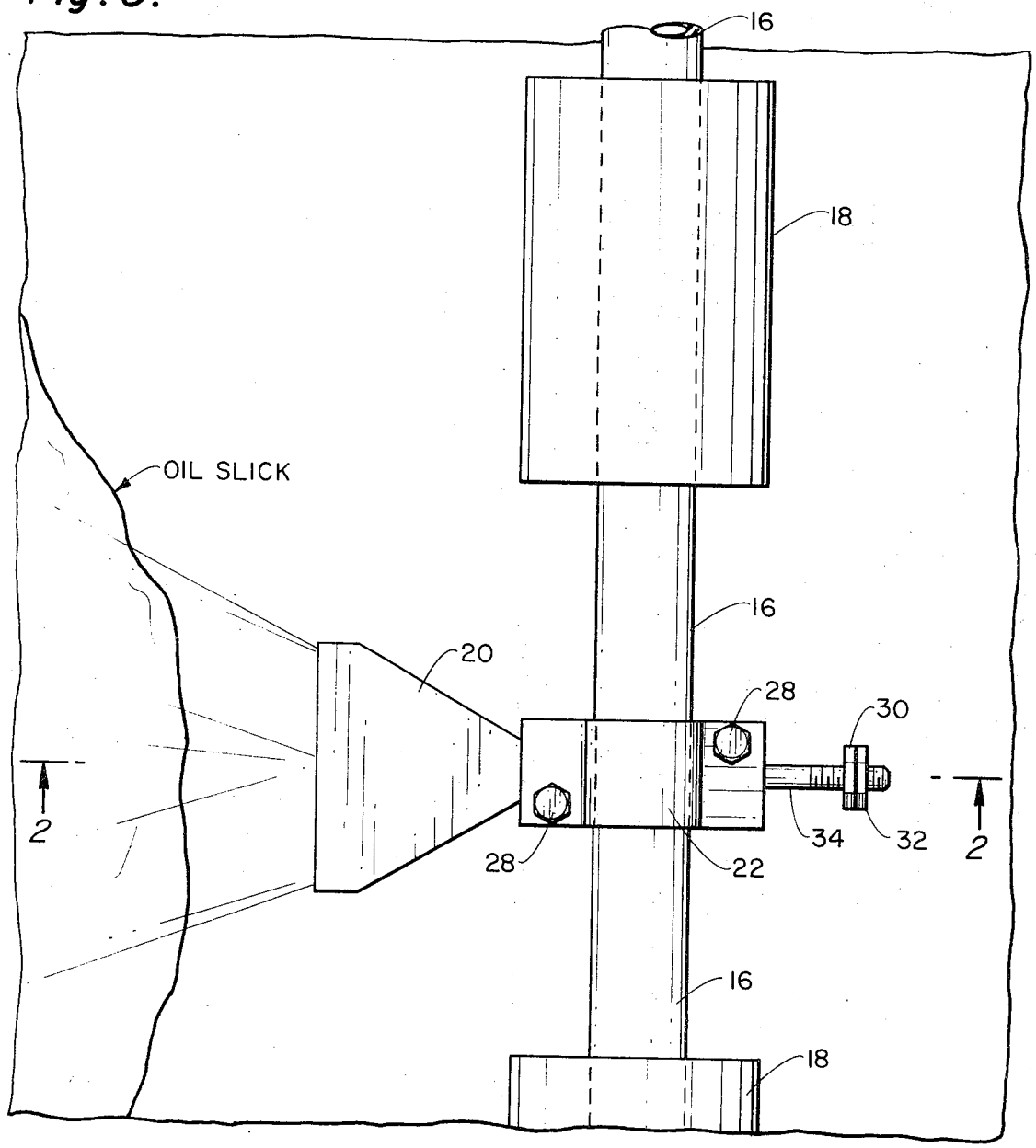

FLOATING WATER JET FOR OIL SLICK CONTROL

BACKGROUND OF THE INVENTION

1. Field of the Invention

The invention relates generally to the containment and recovery of immiscible liquids and more particularly to the containment and recovery of floating oil slicks.

2. Description of the Prior Art

It has long been recognized that the performance of mechanical oil recovery devices, which are preferred in oil spill cleanup operations because of their minimal environmental impact, is a strong function of slick thickness. Thick oil slicks always lead to greatly increased oil recovery rates and some devices become so inefficient as to be worthless when attempting to recover spilled oil from very thin slicks. Techniques used to date to maximize slick thickness in the area of the mechanical collecting device are:

a. reduce containment boom perimeter.
b. direct oil toward collection device with fire hoses.
c. use piston films (monomolecular film wets water surface displacing oil and causing oil to thicken in a "lens").

All of these techniques are effective to some degree in special situations but all have various objections to their use which are overcome by the present invention. Reducing the containment boom perimeter decreases the slick area, thereby increasing the slick thickness. However, the slick is not locally thickened in the area of the oil recovery device, and so a great reduction in slick area is necessary to affect a significant increase in the region of the device. Problems are also encountered in handling the boom in this maneuver for even moderate sized spills and wave conditions. The use of fire hoses does allow for the local buildup of slick thickness in the area of the pickup device within the confines of the boomed area containing the spill, however, the main objection to the use of fire hoses is that they cause excessive turbulence of oil and water and in so doing generate oil-water emulsions which require more storage volume and treatment after collection. Ths use of piston films is only effective if wind and current do not oppose its spreading motion against the oil. Furthermore, piston films are ineffective on highly viscous oil and floating debris, two characteristics which occur commonly in harbor oil spills.

Last and perhaps most important is the fact that the piston films cause oxygen depletion in the water column. Current EPA regulations limit use of this type of chemical to 2 ounces per acre, largely because its toxicity has not been established.

SUMMARY OF THE INVENTION

The present invention involves a device for the containment and recovery of oil floating on the sea. It comprises a flexible rubber hose having attached floats placed at spaced intervals. Water jets are connected to the hose between the floats and counterweights are added to balance the unit. A water pump provides low pressure water to the hose which is sprayed through the jets against the oil slick, forcing it to the recovery mechanism.

STATEMENT OF THE OBJECTS OF THE INVENTION

Accordingly, a primary object of this invention is to provide a means of containing and recovering a liquid floating on the sea.

Another object of the invention is to provide an ecologically safe device which is used to direct the movement of floating oil slicks on water.

Another object of the invention is to provide an economical yet reliable means of containing and recovering oil floating on water.

Other objects, advantages, and novel features of the invention will become apparent from the following detailed description of the invention when considered in conjunction with the accompanying drawing wherein:

BRIEF DESCRIPTION OF THE DRAWINGS

FIG. 2 is an enlarged side elevation of the invention showing the hose with an attached jet between floats.

FIG. 3 is an enlarged top plan view of the invention shown in FIG. 2.

DESCRIPTION OF THE PREFERRED EMBODIMENT

Figure 1:
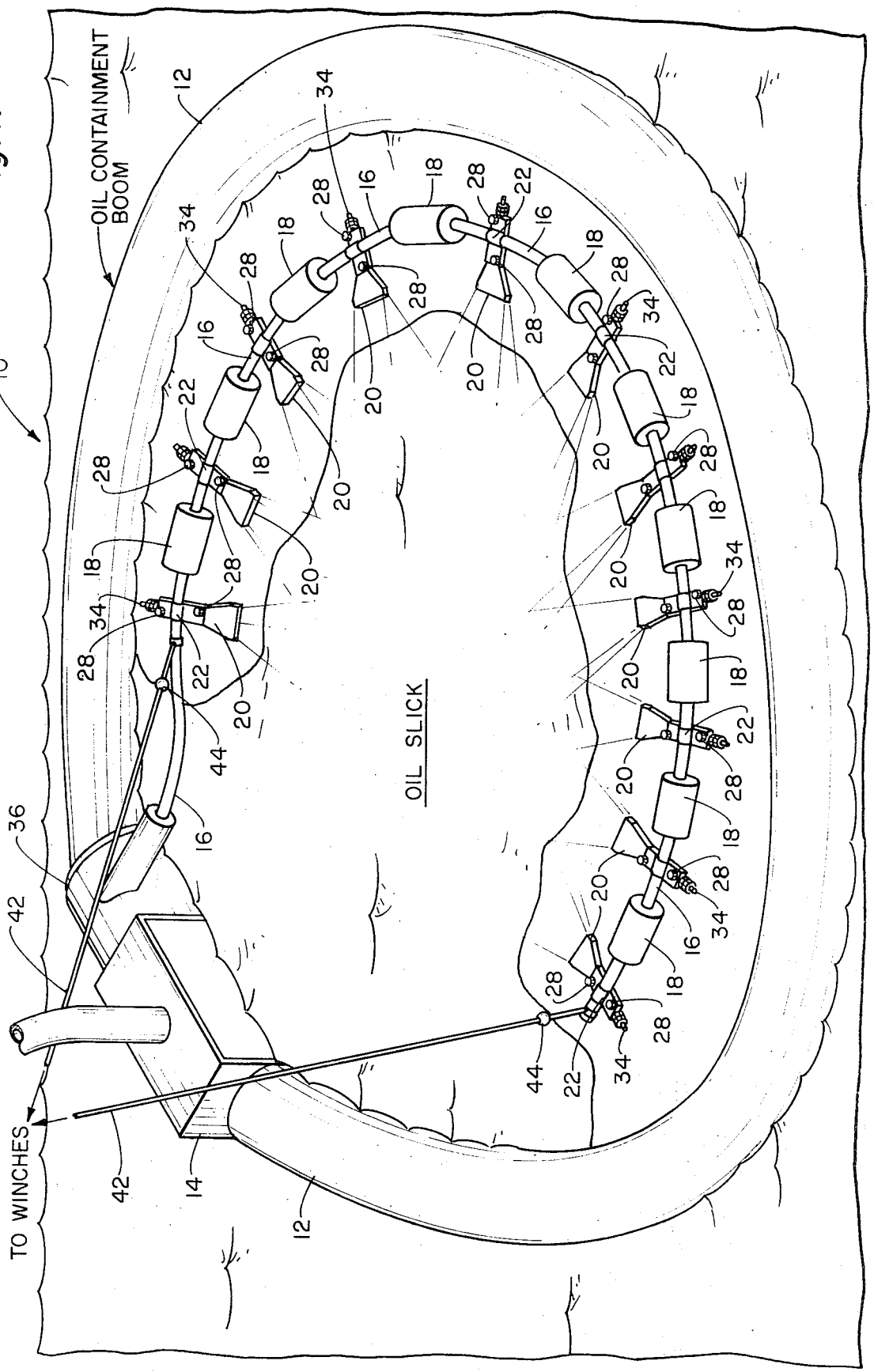
FIG. 1 is a schematic illustration showing the invention inside a boomed area containing an oil spill.

As shown in the drawings, the present device 10 is positioned where it will most likely be deployed, i.e., inside a boomed area containing an oil spill. The device 10 is manually moved about inside the area enclosed by a boom 12 as necessary to direct the floating oil into the oil recovery mechanism 14. Since the oil slick thickness is greatly increased in the region of the recovery mechanism 14, the effectiveness of the device is also greatly increased.

As prefaced by the above remarks, the present device 10 comprises a flexible hose 16, preferably of rubber and having a 1½ inches inside diameter. The floats 18 of conventional fabrication are attached to hose 16 and are positioned at spaced intervals. The floats, while manufactured of any suitable material, are preferably made of closed-sell polyurethane. Water spray jets 20 are connected to the hose 16 between the floats 18 and are clamped in position by the upper and lower clamps 22 and 24, respectively, and by the nut and bolt assembly 26 and 28. Counterweights 30 and 32 are threaded onto the rod 34, mounted to the rear of jets 20, said rod being an extension of clamps. The counterweights are added to uniformly balance the device 10. A water pump 36 schematically shown in FIG. 1 is attached to any suitable floating unit, preferably the recovery mechanism 14. It will be noted that a torque stabilizer 38 is mounted on the bottom of spray jets 20 by the brackets 40 in order to prevent excessive torque movement of the device during actual operation. It will also be noted that tension lines 42 which lead to hand winches located on the recovery mechanism 14 are attached to the flexible hose 16 by swivel joints 44 so as to maintain the position of the jets 20 when operating.

Thus, it is quiescent that the present device is ecologically safe and may be economically constructed from easily available materials. The length of the device 10 can be varied to allow for use in different situations, e.g., shorter for deployment in congested areas and longer for deployment in open, quiescent ponds or lagoons.

Obviously many modifications and variations of the present invention are possible in the light of the above teachings. It is therefore to be understood that within the scope of the appended claims, the invention may be practiced otherwise than as specifically described.

I claim:

1. A device to direct floating oil into a recovery mechanism comprising:

a flexible hose;

floats attached to said hose at spaced intervals;

water jets of the fan jet variety operatively connected to said flexible hose between said floats;

counterweights mounted aft of said water jets and adapted to uniformly balance the entire device; and a water pump to provide low pressure, high volume water to the flexible hose, said water being sprayed through said jets and against the floating oil, forcing the same to a recovery mechanism.

2. The device of claim 1 wherein:

a torque stabilizer is mounted on the bottom of said water jets to prevent excessive torque motion of said jets during operation, thereby keeping the jet in proper position.

3. The device of claim 1 wherein said flexible hose is fabricated of flexible rubber having a 1½ inches inside diameter.

4. The device of claim 1 wherein the floats are fabricated of closed-cell polyurethane.

5. The device of claim 1 wherein said water pump is attached to said recovery mechanism.

6. The device of claim 1 wherein a pair of tension lines are attached at one end to said flexible hose at widely spaced intervals through swivel joints and at the opposite end to a winch;

thus upon operation of the winch, said tension lines draw the hose, jets and other structure toward the oil recovery mechanism which forces the floating oil into the recovery mechanism.

* * * * *